US007468505B2

(12) United States Patent
Kraemer

(10) Patent No.: US 7,468,505 B2
(45) Date of Patent: Dec. 23, 2008

(54) FIBER OPTIC CURRENT SENSOR SYSTEM AND METHOD FOR DETECTING LIGHTNING

(75) Inventor: Sebastian Kraemer, Bavaria (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/459,147

(22) Filed: Jul. 21, 2006

(65) Prior Publication Data

US 2008/0017788 A1 Jan. 24, 2008

(51) Int. Cl.
*G01J 1/04* (2006.01)
*G01J 1/42* (2006.01)
*G01J 5/08* (2006.01)

(52) U.S. Cl. .............. 250/227.11; 324/244.1; 324/72; 361/117

(58) Field of Classification Search ............ 250/227.11; 385/12, 14; 702/57, 64, 65; 361/117; 73/800; 324/244.1, 72

See application file for complete search history.

(56) References Cited

U.S. PATENT DOCUMENTS

| 4,105,966 | A | * | 8/1978 | Lennon et al. ............... 324/113 |
| 5,936,395 | A | * | 8/1999 | Kevorkian et al. ............. 324/96 |
| 6,166,816 | A | * | 12/2000 | Blake ......................... 356/478 |
| 6,741,069 | B1 | * | 5/2004 | Klemar et al. .................. 324/72 |
| 6,756,781 | B2 | | 6/2004 | Duncan et al. |
| 7,057,792 | B2 | * | 6/2006 | Kadogawa et al. ............ 359/281 |

| 2004/0254731 | A1 | * | 12/2004 | Murphy .......................... 702/4 |

FOREIGN PATENT DOCUMENTS

| JP | 08227788 A | * | 2/1995 |
| JP | 2001343401 | * | 12/2001 |

OTHER PUBLICATIONS

Kyuma et al., Journal of Lightwave technology, vol. LT-1, pp. 93-97, Mar. 1983.*
Botros et al., IEEE Instrumentation and Measurement Conference, pp. 179-183, 1989.*
Frankie Y.C. Leung, Wilson C.K. Chiu and M.S. Demokan; Fiber-optic Current Sensor Developed for Power System Measurement:; IEE International Conference on Advances in Power System Control, Operation and Management, Nov. 1991, Hong Kong; pp. 637-643.
T. Sorensen, F.V. Jensen, N. Raben, J. Lykkegaard and J. Szxov; "Lighting Protection for Offshore Wind Turbines"; Electricity Distribution, 2001. Part 1: Contributions. CIRED. 16th International Conference and Exhibition on (IEE Conf. Publ No. 482), vol. 4, 5 pp.
Pritindra Chowdhuri; "Parameters of Lightning Strokes and Their Effects on Power Systems"; Transmission and Distribution Conference and Exposition, 2001 IEEE/PES; vol. 2, 1047-1051.

* cited by examiner

*Primary Examiner*—Thanh X Luu
*Assistant Examiner*—Francis M Legasse, Jr.
(74) *Attorney, Agent, or Firm*—Patrick K. Patnode

(57) ABSTRACT

A system for lightning detection is provided. The lightning detection system includes a conductor configured to receive a lightning strike and transmit a lightning induced current. The system also includes a fiber optic current sensor configured to detect multiple lightning parameters from the lightning induced current and to modulate a beam of radiation in response thereto. The system further includes an electro-optic module configured to receive and convert the beam of radiation from the fiber optic current sensor to an electrical signal.

16 Claims, 4 Drawing Sheets

FIBER OPTIC CURRENT SENSOR SYSTEM AND METHOD FOR DETECTING LIGHTNING

BACKGROUND

The invention relates generally to lightning detection systems and, more particularly, to lightning detection systems for wind turbines.

Lightning is a random phenomenon in nature. Lightning parameters vary depending on geographical conditions and nature of lightning in terms of their intensity and impact on an object. Different lightning detecting techniques exist depending on the application. Wind turbines, in particular, are generally subjected to a high risk of lightning strikes as they are preferentially placed at high and windy locations in order to achieve high productivity.

In general, there are two commonly used lightning detection systems available commercially with wind turbines. One of the detection systems is based on the principle of magnetization. The detection system includes magnetic cards positioned in various parts of a wind turbine blade to detect lightning current passing through. After a lightning impact, the magnetic cards are read out manually by a card reader unit to measure a peak value of current. However, the system is unable to detect the number of lightning sequences striking a wind turbine between periods of two magnetic card readings.

Another detection system includes small antennas fixed on a body of a wind turbine tower in a wind turbine application. The antennas are used to detect lightning current and field that pass the wind turbine tower. Signals from the antennas are transformed from an electrical signal to an optical signal via an optical fiber to a control box. Output of the control box indicates a lightning impact. However, in most cases, the system has to be reset by an acknowledgement signal and an affected blade cannot be identified automatically.

The aforementioned lightning detection systems register only appearance of lightning events without registration of lightning event parameters or localization of impact. Therefore, a need exists for an improved lightning detection system that may address one or more of the problems set forth above.

BRIEF DESCRIPTION

In accordance with one aspect of the invention, a lightning detection system is provided. The lightning detection system includes a conductor configured to receive a lightning strike and transmit a lightning induced current. The system also includes a fiber optic current sensor configured to detect multiple lightning parameters from the lightning induced current and to modulate a beam of radiation in response thereto. The system further includes an electro-optic module configured to receive the beam of radiation from the fiber optic current sensor and convert the beam to an electrical signal.

In accordance with another aspect of the invention, a method of lightning detection is provided. The method includes receiving lightning through a conductor disposed on a surface of an object. The method also includes detecting the lightning via a fiber optic current sensor. The method also includes converting a beam of radiation received from the fiber optic current sensor to an electrical signal via an electro-optic module. The method further includes measuring a plurality of lightning parameters via a data processing unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of the present invention provide a system for detecting lightning and a method for detecting the same. Lightning is detected via measuring a number of lightning parameters. Some non-limiting examples of the lightning parameters used herein include lightning current, a magnetic field induced by the lightning current and localization of impact point of lightning on an object. The system includes a sensor that senses the lightning parameters, for example, based on Faraday rotation of a beam of radiation incident on the sensor. The term "Faraday rotation" used herein is based on a principle known as Faraday effect, wherein a plane of polarization of linearly polarized light propagating in a material that exhibits magneto optic effect, undergoes a rotation through an angle under an influence of an electromagnetic field. The angle of rotation is proportional to a component of the magnetic field parallel to the direction of propagation of the beam of radiation.

Figure 1:
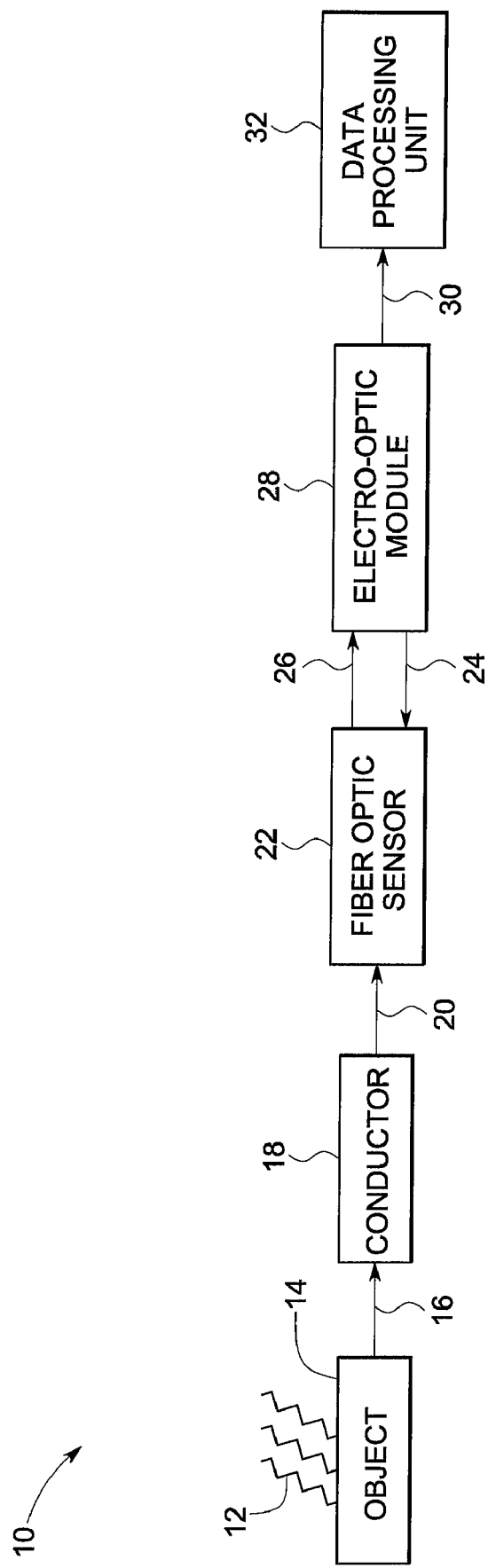
FIG. 1 is a block diagram representation of an exemplary lightning detection system according to an embodiment of the invention.

In an illustrated embodiment of the invention as shown in FIG. 1, a block diagram representation of a lightning detection system 10 is depicted. A lightning stroke 12 strikes an object 14. A lightning current 16 through the object 14 is conducted through a conductor 18 in the object 14. A fiber optic sensor 22 is disposed adjacent to conductor 18 to detect the lightning current 16. The fiber optic sensor 22 is configured to receive a beam of radiation 24 from an electro-optic module 28. In a non-limiting example, the beam of radiation 24 may include radiation of wavelengths in visible, infrared and ultraviolet range. In an exemplary embodiment, the electro-optic module 28 may include a light source to direct beam of radiation 24 to the fiber optic sensor 22. In another exemplary embodiment, the electro-optic module 28 may include one or more polarizers and analyzers to enhance detection of Faraday rotation in the beam of radiation 24. As lightning current 20 conducted through the conductor 18 passes the fiber optic sensor 22, the beam of radiation 24 undergoes a faraday rotation due to the induced lightning current 20. Resultant beam of radiation 26 from the fiber optic sensor 22 is converted to an electrical signal 30 via the electro-optic module 28. The electrical signal 30 is further input to a data processing unit 32 that outputs lightning parameters. In a non-limiting example, the data processing unit 32 may have a sampling rate of at least about 2 MHz.

In an exemplary embodiment of the invention, the fiber optic sensor 22 may be a fiber optic crystal or a fiber optic coil.

In a fiber optic crystal configuration, the system 10 measures lightning induced magnetic field that is parallel to the beam of radiation 24 propagating through the crystal. The fiber optic crystal is disposed near the conductor 18 in the object 14. The lightning induced magnetic field can be measured directly from the rotation of the plane of polarization of the incident beam of radiation 24 also referred to as Faraday rotation and is given by equation 1:

$$\Theta(\lambda,T)=V(\lambda,T)\int Hdl \qquad (1)$$

wherein Θ denotes the angle of Faraday rotation, λ denotes the wavelength of light, T is the temperature, V is the Verdet constant of the fiber optic crystal, and H is the magnetic field intensity along a propagation path l. In a non-limiting example, the crystal may be made of an optically transparent ferromagnetic crystalline material with a high Verdet constant such as yttrium-iron-garnet and gadolinium-iron garnet. The term "Verdet constant" of a material referred herein is defined as an optical constant that is a measure of strength of the Faraday effect for a respective material. Sensitivity of measurements increases with increase in the Verdet constant. The fiber optic current sensor 22 may be configured to measure magnetic fields up to about 150 mT and can support magnetic fields up to about 1000 mT without damage.

In a fiber optic coil configuration, the system 10 measures lightning induced current 16. The term "lightning induced current" used herein refers to current caused by a lightning stroke. In this embodiment, the fiber optic coil 22 is wound around the conductor 18 of the object 14. The angle through which the plane of polarization of the beam of radiation 24 rotates in the fiber optic coil in the presence of a magnetic field induced by lightning current 16 in the coil 22 is given by equation 2:

$$\Theta=VNI \qquad (2)$$

wherein V is the Verdet constant, N is the number of turns in the fiber optic coil 22 and I is the lightning current 16. In order to achieve a desirable signal to noise ratio in an output signal, an optimum value of the number of turns in the coil is needed.

Figure 2:
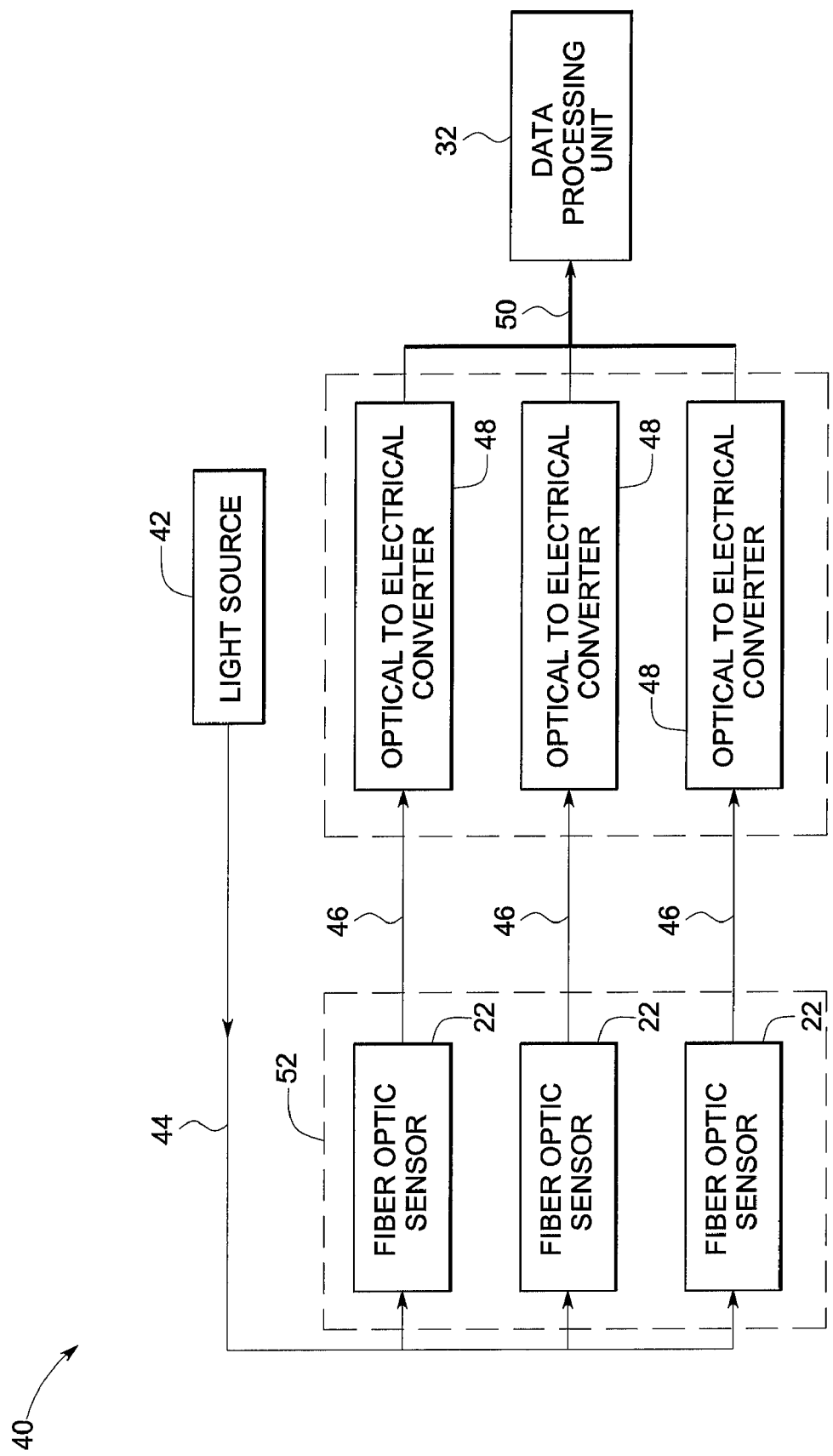
FIG. 2 is a block diagram representation of an exemplary lightning detection system configuration comprising a fiber optic sensor network in accordance with an embodiment of the invention.

FIG. 2 illustrates a block diagram representation of another exemplary lightning detection system configuration 40. The lightning detection system 40 includes a plurality of fiber optic sensors 22 as referred to in FIG. 1 that form a fiber optic sensor network 52. The fiber optic sensor network 52 enables the detection of the localized impact of a lightning strike on an object. The fiber optic sensors 22 may be disposed at an optimal distance from each other. In an exemplary embodiment, the fiber optic sensors 22 may be disposed at around 10 meters from each other. When lightning strikes an impact point on an object 14 as referred to in FIG. 1, a lightning current conducted through the object 14 via a conductor 18 may be detected via the fiber optic sensors 22. The sensitivity of detection increases as the distance of the sensors decreases from the impact point. The lightning detection system 40 also includes a light source 42 that emits a beam of radiation 44 incident on each of the fiber optic sensors 22. The fiber optic sensors 22 detect a faraday rotation in the incident beam of radiation 44 when a lightning strikes an object. The resultant beam of radiation 46 from each of the fiber optic sensors 22 is incident onto multiple electro-optic modules 48 or optical to electrical converters 48 that convert the optical beam of radiation 46 into an electrical signal 50. The electrical signal 50 from each of the electro-optic modules 48 are then processed by a data processing unit 32 as referred to in FIG. 1 that outputs lighting parameters.

Figure 3:
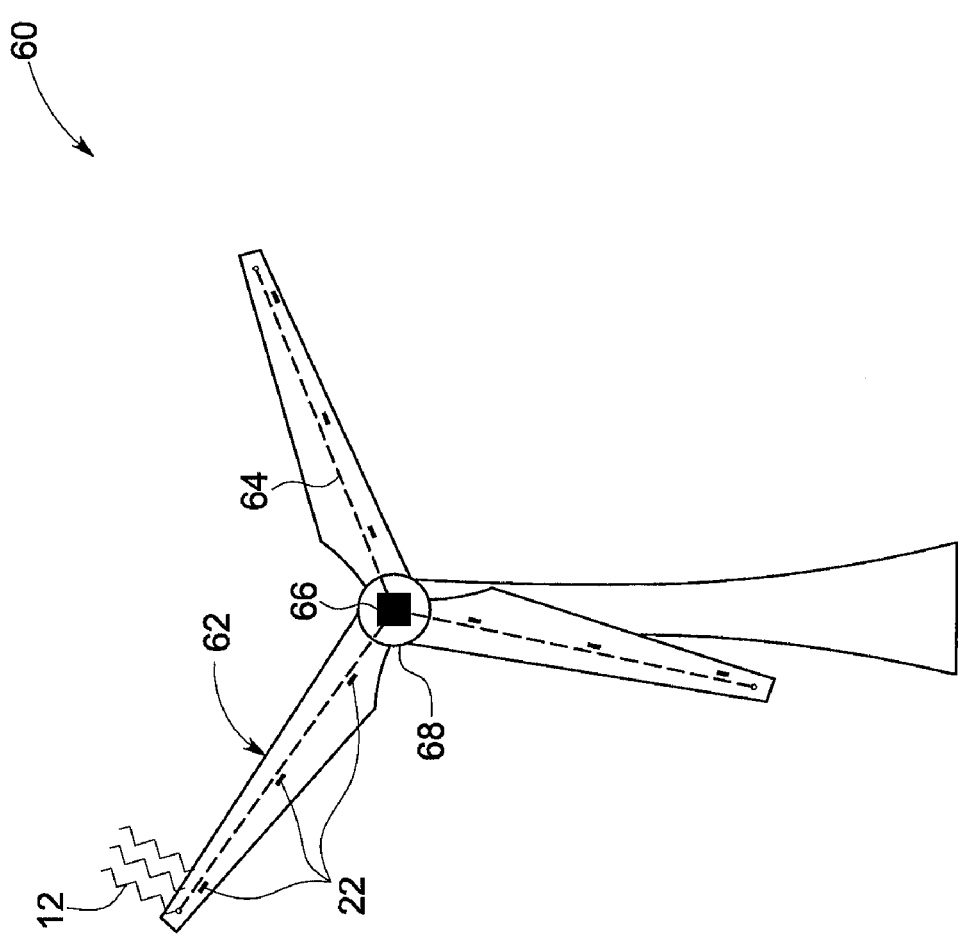
FIG. 3 is a diagrammatic illustration of a wind turbine blade system with a lightning detection system of FIG. 1 installed in accordance with an embodiment of the invention.

In yet another embodiment of the invention as shown in FIG. 3, a diagrammatic illustration of a wind turbine blade system 60 with a lightning detection system 40 of FIG. 1 installed is depicted. It is generally assumed that risk of lightning strikes to an object increases with square of height of the object. In case of wind turbines where the height is typically around 110 m, there is a higher risk of lightning strikes involved. The wind turbine blade system 60 as shown in FIG. 3 includes a series of fiber optic sensors 22 as referred to in FIG. 2 disposed on each of wind turbine blades 62. The fiber optic sensors 22 are disposed at a certain distance from each other to measure impact points on the blade 62. When a lightning 12 strikes the blade 62, lightning current passes through a conductor 64 in the blade 62 that transmits lightning induced current. In an example, the conductor 64 may be an aluminum wire. An electro-optic module 28 as referred to in FIG. 2 including a light source, is disposed in an electromagnetically isolated box 66 at the center 68 of the wind turbine blade system 60, generates a beam of radiation onto the fiber optic sensors 22. The fiber optic sensors 22 detect the lightning current and transmit a corresponding beam of radiation that undergoes Faraday rotation to the electro-optic module 28. The electro-optic module 28 converts an optical beam of radiation from each of the fiber-optic sensors 22 to an electrical signal that is further processed by a data processing unit 32 as referred to in FIG. 2.

In order to extract lightning parameters, a sensor at a bottom of the wind turbine blade 62 may suffice. However, for desirable reliability of measurements and localization of impact point on the blade 62, multiple fiber optic sensors 22 are required, as shown in FIG. 3. The fiber optic sensors 22 are disposed at an optimal distance from each other in order to achieve a desired resolution for determining impact point on the wind turbine blade 62. In an exemplary embodiment, the fiber optic sensors 22 may be disposed at around 10 meters from each other.

In order to determine the optimal distance between adjacent fiber optic sensors 22 and to obtain different parameters on which resolution of localization depends a following worst case scenario is considered. Assume that lightning strikes in the middle of the blade 62 near a fiber optic sensor. In the worst case, an adjacent fiber optic sensor positioned in a direction towards the edge of the blade 62 would be able to measure a minimal lightning induced magnetic field. A maximum distance between the fiber optic sensors 22 may be given by equation 3:

$$d = \mu \frac{I_{min}}{2\pi B_{min}} \qquad (3)$$

wherein μ denotes permeability of the fiber optic sensor, $I_{min}$ denotes a minimal lightning current to be detected by an adjacent sensor for localization and $B_{min}$ is a minimal lightning induced magnetic field measured by the adjacent sensor. Thus in case of a low intensity of lightning referred to as $B_{min}$, the distance between adjacent fiber optic sensors 22 is greater thus leading to a larger sensor network.

Figure 4:
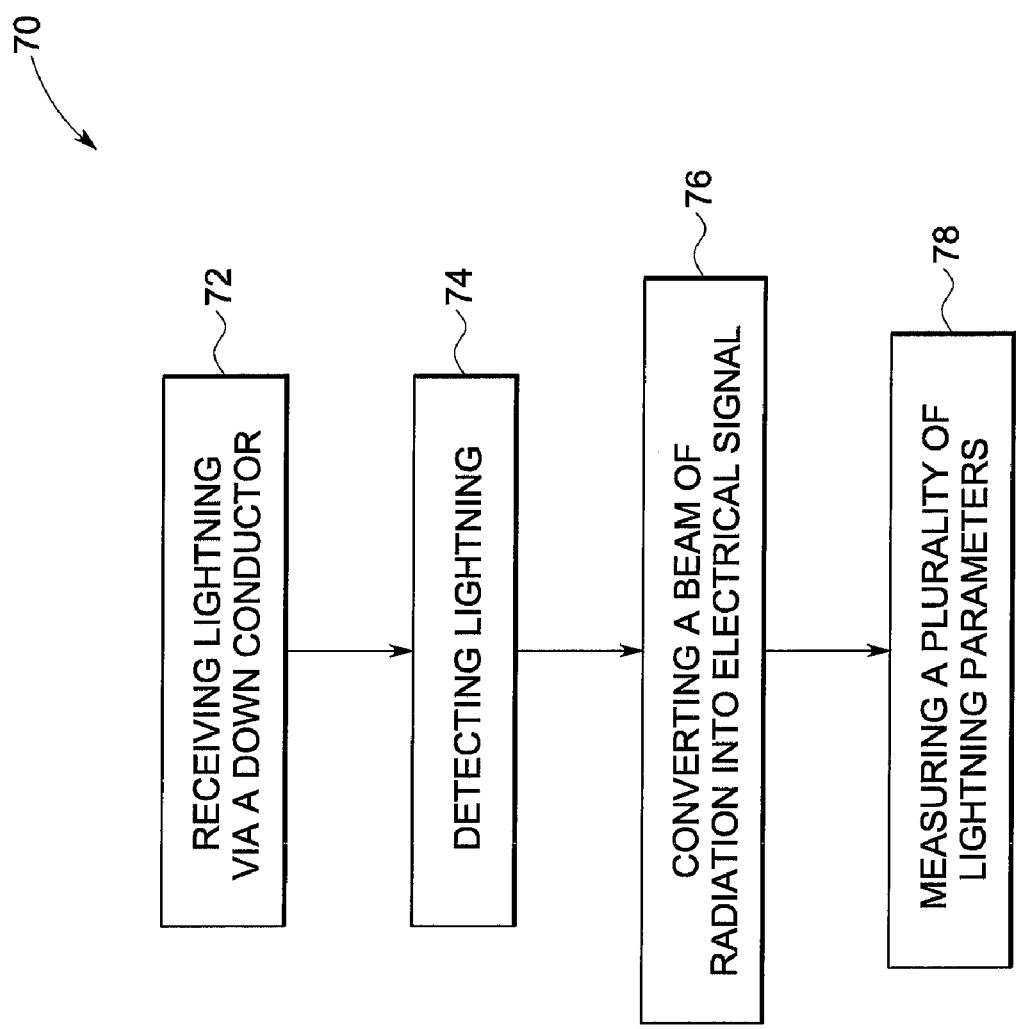
FIG. 4 is a flow chart representing steps involved in an exemplary method for detecting lightning parameters in accordance with an embodiment of the invention.

FIG. 4 is a flow chart representing steps involved in an exemplary method 70 for detecting lightning parameters. The method 70 includes receiving lightning through a conductor that is guiding lightning current from a surface of an object in step 72. The lightning passing through the conductor induces a lightning current that is detected via fiber optic sensors in step 74. The fiber optic sensors modulate a beam of radiation corresponding to lightning induced current based on Faraday rotation of the beam of radiation. The beam of radiation is converted into an electrical signal via an electro-optic module in step 76. The method 70 also includes measuring multiple lightning parameters via a data processing unit in step 78. In an example, step 78 may include measuring lightning induced current and magnetic field. In a particular embodiment, step 78 may include measuring localization of impact of lightning via a plurality of fiber optic current sensors. In another embodiment, measuring in step 78 may include sampling data at a rate of at least about 2 MHz.

While only certain features of the invention have been illustrated and described herein, modifications and changes will occur to those skilled in the art. It is, therefore, to be understood that the appended claims are intended to cover all such modifications and changes as fall within the true spirit of the invention.

The invention claimed is:

1. A lightning detection system comprising:
    a conductor configured to receive a lightning strike and transmit a lightning induced current;
    a fiber optic current sensor configured to detect a plurality of lightning parameters from said lightning induced current and to modulate a beam of radiation from a light source in response thereto; and
    an electro-optic module comprising the light source, the electro-optic module configured to receive and convert said beam of radiation from the fiber optic current sensor to an electrical signal.

2. The lightning detection system of claim 1, wherein said plurality of lightning parameters comprise at least one of current and induced magnetic field.

3. The lightning detection system of claim 1, wherein said fiber optic current sensor is configured to measure magnetic fields up to about 150 mT.

4. The lightning detection system of claim 1, wherein said fiber optic sensor comprises a fiber optic crystal.

5. The lightning detection system of claim 1, wherein said fiber optic sensor comprises a fiber optic coil.

6. The lightning detection system of claim 1, wherein said electro-optic module comprises one or more optical to electrical signal converters.

7. The lightning detection system of claim 1, further comprising a data processing unit configured to output a signal representative of a lightning parameter.

8. The lightning detection system of claim 7, wherein said data processing unit is configured to have a sampling rate of at least about 2 MHz.

9. The lightning detection system of claim 1, further comprising a plurality of fiber optic sensors configured to measure localization of impact of lightning.

10. The lightning detection system of claim 1, wherein said lightning detection system is configured to measure lightning parameters on a wind turbine blade system.

11. A method of lighting detection comprising:
    receiving lightning through a conductor guiding lightning current from a surface of an object;
    detecting the lightning via modulation of a beam of radiation received from a light source and incident upon a fiber optic current sensor;
    converting the beam of radiation modulated and received from the fiber optic current sensor to an electrical signal via an electro-optic module; and
    measuring a plurality of lightning parameters via a data processing unit.

12. The method of claim 11, wherein the detecting comprises measuring faraday rotation of a plane of polarization of an incident light from the light source.

13. The method of claim 11, wherein the measuring comprises measuring a lightning induced magnetic field.

14. The method of claim 11, wherein the measuring comprises measuring lightning induced current.

15. The method of claim 11, wherein the measuring comprises measuring localization of impact of lightning via a plurality of fiber optic current sensors.

16. The method of claim 11, wherein the measuring comprises sampling data at a rate of at least about 2 MHz.

* * * * *